Aug. 4, 1970   G. V. MIRAM   3,522,469
MAGNETIC BEAM FOCUSING STRUCTURE FOR A TRAVELING WAVE TUBE
EMPLOYING MAGNETIC SHUNTS BETWEEN THE POLE
PIECES AND THE EMITTER
Filed April 12, 1968

INVENTOR.
GEORGE V. MIRAM
BY
Leon F. Herbert
ATTORNEY

United States Patent Office 3,522,469
Patented Aug. 4, 1970

3,522,469
MAGNETIC BEAM FOCUSING STRUCTURE FOR A TRAVELING WAVE TUBE EMPLOYING MAGNETIC SHUNTS BETWEEN THE POLE PIECES AND THE EMITTER
George V. Miram, Daly City, Calif., assignor to Varian Associates, Palo Alto, Calif., a corporation of California
Filed Apr. 12, 1968, Ser. No. 720,884
Int. Cl. H01j 25/34, 23/08
U.S. Cl. 315—3.5                                             4 Claims

ABSTRACT OF THE DISCLOSURE

A microwave tube is disclosed. The tube includes an electron gun at one end for projecting a beam of electrons over an elongated beam path through an interaction circuit to a collector structure at the opposite end of the tube. A beam focus solenoid surrounds the tube and includes a pair of magnetic pole piece structures disposed at opposite ends of the solenoid for providing a beam focusing magnetic field through the interaction circuits. One or two cylindrical magnetic shunts concentrically surround the cathode emitter in the space between a cylindrical bore in the cathode pole piece and the cathode emitter for shunting a substantial amount of the stray leakage field of the electron beam focusing magnetic field to the pole piece structure.

DESCRIPTION OF THE PRIOR ART

Heretofore, magnetic beam focusing circuits for microwave tubes have been constructed which employed magnetic cylinders surrounding the cathode emitter for shaping the magnetic field in the region of the electron gun. For example, U.S. Pat. 3,331,984 issued July 18, 1967, and assigned to the same assignee as the present invention teaches the pervasion of a cylindrical magnetic field shaping member disposed inside the central aperture of the cathode pole piece and disposed surrounding the cathode emitter for increasing the convergence of the magnetic field in a relatively high beam convergence gun. In this instance, the magnetic field shaping member was shaped and disposed such that the iron saturated in a region overhanging the emitting surface of the cathode emitter such that the beam focus magnetic field intensity was decreased behind the emitter and increased in the region between the emitter and the gun for increasing the convergence of the beam.

In another prior art reference, namely, U.S. Pat. 2,905,847 issued Sept. 22, 1959, the electron gun is disposed inside the cylindrical magnetic shield and a centrally apertured magnetic plate is disposed at the inner end of the cylindrical shield, in spaced relation therefrom, for shunting a substantial portion of the beam focus magnetic field through the shield to increase the convergence of the magnetic field in the region between the cathode emitter and the anode electrode. As in the previous example, this latter electron gun was of a relatively high convergence, i.e., an area convergence between 25 and 30.

Low beam convergence tubes have also been built using various field shaping magnetic members in the region of the cathode emitter. However, in the case of a low beam convergence magnetic beam focusing structure, especially when the electron gun is operating with perveance greater than $1.5 \times 10^{-6}$ at relatively high microwave frequencies, it is desirable that the magnetic beam focusing structure be reduced to the minimum size required to produce the required beam focusing magnetic field. This requires that the leakage flux from the beam focusing magnet be kept to a minimum. To reduce the leakage magnetic flux, the beam hole in the cathode magnetic pole piece structure should be reduced to a minimum diameter.

Generally speaking, in low beam convergence beam focusing magnetic circuits, the cathode emitter should be placed generally in the plane of the entrance to the central aperture in the cathode pole piece. In addition, when operating at relatively high power levels and beam voltages, i.e., in excess of 10 kv., and when operating with a modulating anode, the beam focus electrode structure and the modulating anode electrode structure must be accommodated in the radial space between the cathode emitter and the inside bore of the magnetic pole piece. Since these electrodes must be insulatively supported with respect to each other to hold off the relatively high operating potential supplied thereto, this causes the minimum diameter of the bore in the cathode pole piece to be relatively large, thereby producing a relatively large leakage flux. This requires the magnetic beam focusing structure to be larger and heavier than desirable, and heretofore has required additional field shaping coils.

SUMMARY OF THE PRESENT INVENTION

The principal object of the present invention is the provision of an improved magnetic beam focusing structure for microwave tubes having low beam convergence.

One feature of the present invention is the provision, in a magnetic beam focusing structure for a microwave tube, of a cylindrical bore in the cathode pole piece of the magnetic circuit, the bore accommodating a cathode therewithin which is surrounded by a cylindrical magnetic shunt, the shunt having a length axially coextensive with the cylindrical bore which is greater than twice the characteristic radial spacing between the shunt and the cylindrical bore, whereby the magnetic shunt serves to shunt a substantial amount of the beam focus magnetic field through the cathode pole piece structure to reduce the magnetic leakage field of the beam focusing solenoid.

Another feature of the present invention is the same as the preceding feature including the provision of a second hollow cylindrical magnetic shunt concentrically disposed in electrically insulative and radially spaced relation within the first magnetic shunt, the second shunt having a length axially coextensive with the first shunt which is greater than twice the characteristic radial spacing between the first and second shunt to further reduce the leakage magnetic flux of the solenoid.

Another feature of the present invention is the same as the first feature including the provision of a non-magnetic electrode structure affixed to the magnetic shunt, the non-magnetic electrode projecting from the shunt radially toward the axis of the beam for producing an electric field operative upon the beam.

Another feature of the present invention is the same as the preceding feature wherein the non-magnetic electrode structure comprises either a focus electrode or a modulating anode electrode structure.

Other features and advantages of the present invention will become apparent upon a perusal of the following specification taken in connection with the accompanying drawings wherein:

DESCRIPTION OF THE PREFERRED EMBODIMENTS

Figure 1:
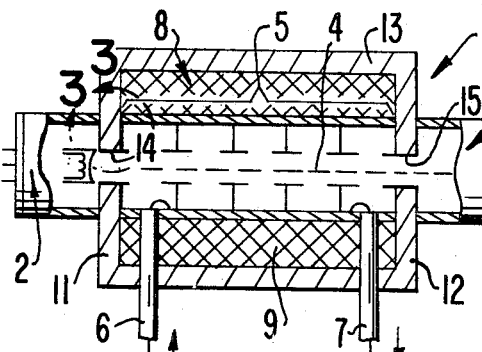
FIG. 1 is a schematic longitudinal view, partly in section, showing a microwave tube incorporating features of the present invention.

Referring now to FIG. 1 there is shown a microwave tube 1 incorporating features of the present invention. The tube 1 includes an electron gun 2 for forming and projecting a beam of electrons over an elongated beam path to a beam collector structure 3 disposed at the terminal end of the beam path 4. A microwave interaction circuit 5, such as a series of re-entrant cavity resonators, is arranged along the beam path 4, intermediate the electron gun 2 and the beam collector 3, for interaction with the beam to amplify a microwave signal. More specifically, microwave signal energy to be amplified is applied to the upstream end of the microwave circuit 5 via an input coaxial line 6 and output amplified energy is extracted from the downstream end of the microwave circuit 5 via output coaxial line 7.

A magnetic beam focusing structure 8 coaxially surrounds the beam path 4 and microwave circuit 5 for producing an axially directed beam focusing magnetic field H within the beam path 4. The beam focusing magnetic circuit 8 includes a solenoid 9, coaxially disposed of the beam path 4, and a pair of magnetic pole pieces 11, 12 disposed at opposite ends of the solenoid 9. A magnetic yoke 13 interconnects the pole pieces 11 and 12 to provide a magnetic flux return path externally of solenoid 9 between the pole pieces 11 and 12. The pole pieces 11, 12 are centrally apertured at 14 and 15 to permit the beam to pass therethrough.

Figure 2:
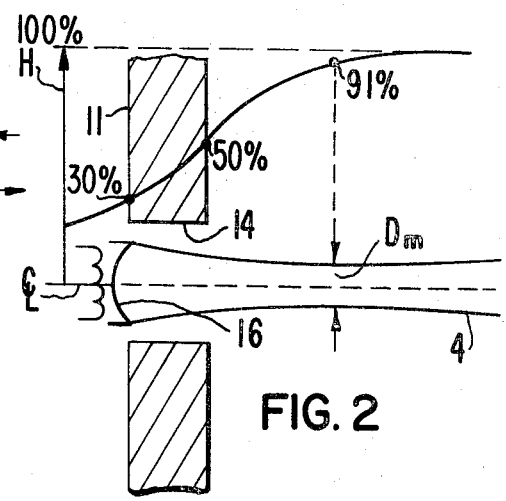
FIG. 2 is a schematic sectional view of the cathode and cathode pole piece structure having superimposed thereon a plot of axial magnetic field intensity H versus distance along the beam path.

Referring now to FIG. 2 there is shown, in schematic form, the magnetic pole 1 of structure 11 in the region of the electron gun. More specifically, a plate-shaped cathode pole piece 11 is centrally bored at 14 and a cathode emitter 16 of the electron gun assembly 2 is disposed within the bore 14 substantially at the entrance thereof. An anode structure, not shown, forms a portion of the electron gun and causes the electron beam to be formed and projected along the beam path 4 with an area convergence falling within the range of 2 to 10, i.e. the ratio of cathode emitter area to minimum cross sectional area of the beam, depicted at $D_M$ falls within the range of 2 to 10.

The magnetic circuit of FIG. 2 depicts the situation wherein the area convergence is approximately 3 to 1. In such a case, the cathode emitter 16 should be disposed in a plane where the beam focusing magnetic field H has been reduced to approximately 30% of its maximum beam focusing intensity. In such a structure, this 30% point occurs approximately at the entrance plane of the bore 14. It will also be found that the magnetic field is approximately 50% of its maximum at the exit plane of the bore 14. In order to minimize the leakage of magnetic field through the bore 14 to the surrounds of the solenoid, the bore 14 should have the smallest diameter which will accommodate the required physical diameter of the cathode emitter 16. However, in most cases, a beam focus electrode structure is required surrounding the cathode emitter 16 and, in addition, it is often desirable to provide a modulating anode electrode which surrounds the focus electrode.

Since the modulating anode electrode must be capable of operating at a potential which can swing between cathode potential and anode potential, suitable insulative structure or space must be provided between the modulating anode structure and the cathode emitter or its focus electrode and the inside wall of the bore 14 in the pole structure 11. This radial space, required to accommodate the various insulations for the various separate electrodes surrounding the cathode emitter, substantially increases the minimum diameter of the bore 14, thereby resulting in a substantial magnetic leakage flux which requires that the magnetic beam focus structure 8 be larger and heavier than desired.

Figure 3:
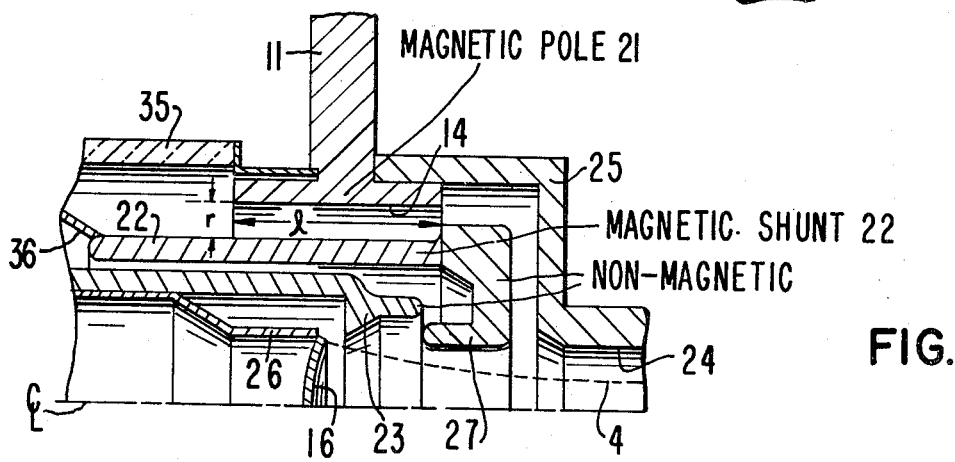
FIG. 3 is an enlarged detailed view of a portion of a structure of FIG. 1 delineated by line 3—3.

Referring now to FIG. 3 there is shown an electron gun and magnetic beam focusing circuit incorporating features of the present invention. More specifically, the central cylindrical bore 14 in the cathode pole piece structure 11 as of iron has been lengthened in the axial direction by the provision of a cylindrical sleeve structure 21 as of iron. A first hollow cylindrical magnetic shunt 22 as of soft iron is coaxially disposed of the cylindrical bore 14 in insulatively spaced relation therefrom. Magnetic shunt 22 is provided with a substantial length $l$ which is axially coextensive with the axial length of the bore. More specifically, the axial coextensive length $l$ of the magnetic shunt 22 is greater than twice the characteristic radial spacing $r$ between the shunt 22 and the inside of the cylindrical bore 14. The radial spacing $r$ permits the magnetic pole 11 to be operated at anode potential, whereas the magnetic shunt 22 may be operated at or near cathode potential. Suitable insulative support members, more fully disclosed below with regard to FIG. 4 serve to physically support the magnetic shunt 22 within the cylindrical bore 14.

A hollow cylindrical non-magnetic beam focus electrode structure 23 surounds the cathode emitter 16 for focusing the electron beam 4 through a central aperture 24 in an anode electrode structure 25 of the electron gun 2. The cathode emitter 16 is supported from the inside of the non-magnetic focus electrode 23 via a thin tubular support member 26. An annular non-magnetic electrode structure 27 is affixed to the end of the magnetic shunt 22 and projects radially inwardly from the shunt 22 toward the beam axis. The non-magnetic electrode 27 forms a modulating anode electrode disposed intermediate the main anode 24 of the cathode emitter 16 for modulating the intensity of the electron beam 4.

The magnetic pole structure 11 and sleeve 21 together with the magnetic shunt 22 are so shaped as to cause the magnetic field lines passing through the cathode emitter 16 and along the beam path 4 to have a converging shape conforming generally to the converging shape of the electrostatic electric field lines at the beam edge in the region between the cathode emitter 16 and the anode 25. In this manner, the beam 4 has the proper convergence and the trajectories of the electrons, at the edge of the beam, are not unduly perturbed such that laminar electron flow is maintained.

Use of the magnetic shunt 22 allows the minimum diameter of the cylindrical bore to be made sufficiently large to accommodate the cathode, focus electrode 23, modulating anode and shunt 22 together with their insulative spacings while reducing the leakage magnetic flux. In this regard, the magnetic shunt 22 serves to collect magnetic flux, which would otherwise leak through the bore 14, and to direct the magnetic flux through the relatively thin radial gap and into the inside wall of the sleeve 21 and thence through the magnetic pole 11 and yoke 13.

Figure 4:
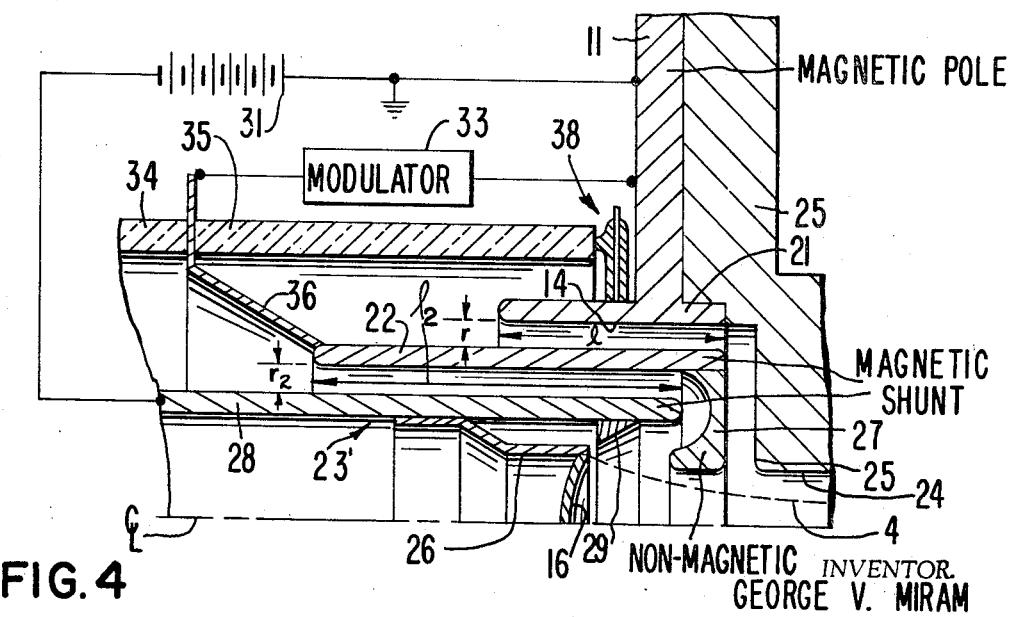
FIG. 4 is an alternative embodiment of the structure of FIG. 3 incorporating features of the present invention.

Referring now to FIG. 4 there is shown an alternative electron gun and magnetic beam focusing circuit. More specifically, the structure of FIG. 4 is essentially the same as that of FIG. 3 with the exception that the beam focus electrode 23' is formed by a second hollow cylindrical magnetic shunt 28, as of soft iron, which surrounds the cathode emitter 16 and which is axially coextensive with the first hollow cylindrical magnetic shunt 22. The second shunt member 28 is radially spaced from the first shunt 22 by a relatively small radial spacing $r_2$ and is axially coextensive with the first shunt 22 over a length $l_2$. In this manner, a substantial amount of the leakage flux which would tend to leak out of bore 14 is collected by the second magnetic shunt 28 and directed through a relatively small radial gap and into the first magnetic shunt 22, thence through the first radial gap to the magnetic sleeve 21 and thence through the magnetic pole 11. As in the case of the first magnetic shunt 22, the radial gap $r_2$ should be much less than ½ of the axially coextensive length of the gap $l_2$ to substantially reduce the reluctance of the gap. An annular non-magnetic beam focus electrode structure 29 is affixed to the second magnetic shunt member 28 and projects radially inward toward the beam 4 to properly shape the electrostatic field lines in the region of the cathode emitter 16 for focusing the electron beam 4 over the desired path through the anode 25.

A high voltage power supply 31 is connected between the cathode pole piece 11 and the cathode emitter 16 through the focus electrode 23' for applying the beam voltage between the anode structure 25 and the cathode emitter 16. An anode modulator supply 33 modulates the anode potential applied to the modulating anode electrode 27 for varying the intensity of the beam 4. High voltage standoff insulators 34 and 35, which also form portions of the vacuum envelope of the tube 1, provide the required insulation between the potentials applied to the cathode emitter 16, modulating anode 27, and the anode 25. The insulators are sealed at their adjacent ends to a modulating anode support 36 which includes a conical section fixed to the end of the first magnetic shunt 22 for supporting the shunt within the tube and for applying the electrical potential thereto. The other end of insulator 35 is sealed in a vacuum tight manner to the pole structure 11 via a conventional vacuum tight joint 38.

The advantage of the two concentric magnetic shunts 22 and 28 or single shunt 22 is that it effectively reduces the hole size 14 in the cathode pole piece 11 to reduce the amount of leakage flux. In this manner, a smaller beam focusing solenoid may be employed to reduce the cost and size of the beam focus magnetic circuit, and eliminates the the previous requirement for field shaping coils.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a microwave tube apparatus, means for forming and projecting a beam of electrons over an elongated beam path; means at the terminal end of the beam path for collecting and dissipating the energy of the electrons; means forming a microwave circuit disposed along the beam path between said beam-forming means and said beam collecting means for interaction with the beam to produce an output microwave signal; means forming a magnetic circuit for focusing the beam over its path between said beam-forming means and said beam collecting means; said magnetic circuit including, a solenoid coaxially disposed of the beam path, a magnetic yoke made of magnetically permeable material extending lengthwise of said solenoid and having a pair of centrally apertured pole piece structures through which the beam passes, one of said pole pieces forming the cathode pole piece and being disposed at the upstream end of the beam path, the improvement wherein: the central aperture in said cathode pole piece is defined by an axially directed cylindrical bore through said pole piece structure, said beam-forming means including a cathode emitter disposed inside said cylindrical bore in said cathode pole piece, a hollow cylindrical magnetic permeable shunt member coaxially disposed in electrically insulative relation within and with respect to said cylindrical bore in said pole piece structure and disposed surrounding said cathode emitter, said magnetic shunt having a length axially coextensive with said bore which is greater than twice the characteristic radial spacing between said shunt and said cylindrical bore, whereby said magnetic shunt serves to shunt a substantial amount of the beam focus magnetic field through said pole piece structure to reduce the magnetic leakage field of said beam focus solenoid, a centrally apertured non-magnetic electrode structure affixed to said magnetic shunt, said electrode structure projecting from said shunt radially toward the axis of the beam with its central aperture coaxially aligned with the beam, said beam-forming means including an anode electrode, and means for applying a potential to said non-magnetic electrode structure relative to the potential of said anode electrode.

2. The apparatus of claim 1 including means forming a second hollow cylindrical magnetic shunt member concentrically disposed in electrically insulative and radially spaced relation within said first shunt member and disposed surrounding said cathode emitter, said second shunt member having a length axially coextensive with said first shunt member which is greater than twice the characteristic radial spacing between said first and second shunt members, whereby said second shunt serves to shunt a substantial amount of the beam focus magnetic field through said first shunt and said pole piece structure.

3. The apparatus of claim 1 wherein said magnetic shunt is electrically connected to said cathode emitter to operate at the same electrical potential as said cathode emitter, whereby said non-magnetic electrode serves as a beam focus electrode.

4. The apparatus of claim 1 including means for applying an electrical potential to said magnetic shunt which is independent of the potential of said cathode emitter and the potential of said anode electrode such that said non-magnetic electrode structure forms a modulating anode for modulating the beam current.

References Cited

UNITED STATES PATENTS 2,608,668   8/1952   Hines _____ 315—3.5
2,774,006   12/1956  Field _____ 315—3.5

FOREIGN PATENTS 920,717   3/1963   England.

HERMAN KARL SAALBACH, Primary Examiner

F. P. BUTLER, Assistant Examiner

U.S. Cl. X.R.

313—84, 159; 315—5.35